(12) United States Patent  (10) Patent No.: US 7,676,574 B2
Glommen et al.  (45) Date of Patent: Mar. 9, 2010

(54) INTERNET WEBSITE TRAFFIC FLOW ANALYSIS

(75) Inventors: Charles Glommen, Oceanside, CA (US); Blaise Barrelet, San Diego, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 0 days.

(21) Appl. No.: 12/330,364

(22) Filed: Dec. 8, 2008

(65) Prior Publication Data

US 2009/0083421 A1  Mar. 26, 2009

Related U.S. Application Data

(63) Continuation of application No. 10/838,438, filed on May 4, 2004, now Pat. No. 7,464,187, which is a continuation of application No. 10/072,274, filed on Feb. 8, 2002, now Pat. No. 6,766,370, which is a continuation of application No. 09/326,475, filed on Jun. 4, 1999, now Pat. No. 6,393,479.

(51) Int. Cl.
*G06F 15/16* (2006.01)
*G06F 12/00* (2006.01)
(52) U.S. Cl. .................................. 709/224; 709/250
(58) Field of Classification Search ................. 709/219, 709/223–224, 203, 242, 230, 250
See application file for complete search history.

(56) References Cited

U.S. PATENT DOCUMENTS 5,948,061 A  9/1999 Merriman et al.
5,974,572 A * 10/1999 Weinberg et al. ............ 714/47
6,041,309 A  3/2000 Laor
6,078,956 A  6/2000 Bryant et al.

(Continued)

FOREIGN PATENT DOCUMENTS

WO  WO9726729  7/1997

OTHER PUBLICATIONS

"Metrics and Methodology", The Media Measurement Task Force, Online!, pp. 1-9, Oct. 15, 1997. Retrieved from the internet: http://www222.uchicago.edu/computing/cookies/html.

(Continued)

*Primary Examiner*—Zarni Maung
(74) *Attorney, Agent, or Firm*—Robert C Kowert; Meyertons, Hood, Kivlin, Kowert & Goetzel, P.C.

(57) ABSTRACT

An Internet-based analysis tool follows, in real-time, the flow of traffic through a website. For every website page requested by a website visitor, the state of the visitor's browser is recorded and data relating to the path visitors take through the website is collected and studied. The state of the visitor's browser path is maintained in a traffic analysis cookie that is passed between a website file server and the visitor browser with every page requested for viewing. The cookie is maintained in a size that can be passed from server to browser and back again without negatively impacting server performance and without negatively impacting browser performance. The data in the cookie can follow the visitor browser through independent file servers, regardless of how the pages of a website might be distributed in storage.

19 Claims, 6 Drawing Sheets

U.S. PATENT DOCUMENTS

| | | | |
|---|---|---|---|
| 6,112,238 | A | 8/2000 | Boyd et al. |
| 6,237,033 | B1 | 5/2001 | Doeberl et al. |
| 6,341,310 | B1 * | 1/2002 | Leshem et al. ............... 709/223 |
| 6,381,632 | B1 * | 4/2002 | Lowell ....................... 709/203 |
| 6,393,479 | B1 | 5/2002 | Glommen et al. |
| 6,470,383 | B1 * | 10/2002 | Leshem et al. ............... 709/223 |
| 6,484,149 | B1 | 11/2002 | Jammes et al. |
| 6,515,968 | B1 | 2/2003 | Combar et al. |
| 6,766,370 | B2 | 7/2004 | Glommen et al. |
| 6,925,442 | B1 | 8/2005 | Shapira et al. |

OTHER PUBLICATIONS

Pitkow, J., "In search of reliable usage data on the WWW", Computer Networks and ISDN System, NL, North Holland Publishing, V.29, No. 8-13, pp. 1343-1355, Sep. 1, 1997.

The U.S. Department of Energy Computer Incident Advisory Capability: "Internet Cookies" Information Bulletin, 'Online!, pp. 1-9, Mar. 12, 1998, Retrieved from the internet: http://www.iab.net/advertise/content/mmtf3.html.

Wu, K., "Speedtracer: A Web usage mining analysis tool" IBM Systems Journal, US, IBM, Corp. Armonk, New York, V. 37, No. 1, pp. 89-105 (1998).

* cited by examiner

```
<html>
<head>
<title> Website Page </title>
<p> Image <img src = http://www.domain.com/imageFile.jpg> </p>
<p> <a href = "http://www.domain.com/nextpage.html/">Link to next
page at website. </a> </p>
<p> <a href = "http://www.traffic_analysis_code.com"> </a> </p>
```

FIG. 5 cookie:<cookiename(same as account ID)>=<imageID>:<site visit count:<average time betweeen site visits>:<time spent so far on this site-visit>:<current clock time in milliseconds>:<indexed path data delimited by the "|" character>

FIG. 8 cookie: HB59999999999=01011:1:0:0:9277594645:|0|1|0|1

FIG. 9

```
<a href="http://www.websidestory.com">
<img src="http://w200.hitbox.com/
Hitbox?hb=HB55F9503B3F&cd=1&l=sub&n=Browsers"
width=50 height=50 ALT="" border="0" align=right></a>
```

FIG. 11

```
<script language="javascript">
<!--dt=(new Date()).getHours();sv = 10;ss="na";sc="na";ln="";pl="";
rf=escape(document.referrer)+"";
if((rf=="undefined")||(rf=="")){rf="bookmark";};
bn=navigator.appName;
if(bn.substring(0,9)=="Microsoft"){bn="MSIE";};
bv=Math.round(parseFloat(navigator.appVersion)*100);
if(navigator.appName=="Netscape")
if(bv>400) ln=navigator.language;
if(bv>300) for(var i=0;i<navigator.plugins.length;i++)
pl +=navigator.plugins[i].name+":"};--></script>
<script language="javascript1.1">
<!--sv=11;ja=(navigator.javaEnabled()==true)?"y":"n";--></script>
<script language="javascript1.2">
<!--sv=12;ss=screen.width+"*"+screen.height;
sc=(bn=="MSIE")?screen.colorDepth:screen.pixelDepth;
if(sc=="undefined"){sc="na";};--></script>
<script language="javascript1.3"><!--sv=13;--></script>
<script language="javascript">
<!--arg="&bn="+bn+"&bv="+bv+"&ss="+ss+"&sc="+sc+"&dt="+dt+"&sv="+sv;
arg+="&ja="+ja+"&rf="+rf+"&ln="+ln+"&pl="+escape(pl);
x1="<a href='http://www.hitbox.com'>";
x2="<img src='http://w200.hitbox.com/Hitbox?hb=HB55F95O3B3F&cd=1
   &n=StatMarket+Home+Page";
x3="&cd=1&bt=2' border='0' height='50' width='50'";
x4="alt=''></a>";
document.write(x1+x2+arg+x3+x4);--></script>
<script language="javascript1.2">
<!--document.write("<");document.write(!--");--></script>
<noscript><a href='http://www.hitbox.com'><img
  src='http://w200.hitbox.com/Hitbox?cd=1&bt=2&hb=HB55F95O3B3F
  &n=StatMarket+Home+Page'
border='0' height='50' width='50'alt=''></a></noscript>
<script language="javascript1.2">
<!--document.write("--");document.write(?>?);--></script>
```

FIG. 10

INTERNET WEBSITE TRAFFIC FLOW ANALYSIS

RELATED APPLICATION

The present application is a continuation of U.S. patent application Ser. No. 10/838,438 filed on May 4, 2004, which is a continuation of U.S. Pat. No. 6,766,370, which is a continuation of U.S. Pat. No. 6,393,479, each of which is incorporated herein by reference in its entirety.

BACKGROUND

1. Field of the Invention

This invention relates generally to computer network communications and, more particularly, to analysis of Internet traffic to a website.

2. Related Art

The best-known computer network in use today is probably the Internet. When a network user begins a communication session over the Internet, the user can request data files from an Internet-connected computer called a file server or website server. The file server provides data files, typically comprising website pages, that are requested by the user. The web pages are typically written in a type of programming code called hypertext mark-up language (html), and can be viewed or displayed through a graphical user interface (GUI) program. The network connections and collection of html files are commonly referred to as the "World Wide Web" and the GUI program to view the files is called a web browser. A collection of related files under a common Internet network domain location is commonly referred to as a website. The files available at a website can include a mixture of text, image, video, and audio data.

The Internet is being used more and more often for commercial purposes. Thus, websites have become an important means for businesses and individuals to disseminate new product and service information, public relations news, advertising, and even to transact business by receiving orders and payments over the Internet. Many Internet users who maintain websites carefully monitor the pattern of web browser requests for files, or web pages, from their website. As with most forms of advertising, a goal of providing a website is to have a large number of visitors to the website to view the commercial presentation. As a result, various software programs and monitoring services have been developed to track such file requests, which are generally referred to as web traffic, and to produce website traffic analysis reports. The Internet users who maintain websites will be referred to generally as website owners.

Some website traffic analysis tools comprise software that collects traffic statistics from the computer at which the website files are stored, or hosted. Website owners typically have, at a minimum, access to the computer on which their sites are hosted. Some website owners maintain their website on their own computer systems, but many lease storage space on a remote computer system from a web-hosting provider. Web hosting providers typically impose restrictions on the use of their systems, so that installation of third party software on the website hosting computer, or webserver, is usually precluded. This limits the appeal of website traffic analysis software that must be installed at a website hosting computer.

There are generally two common types of website analysis tools available: log-based tools and Internet-based tools.

Log-Based Traffic Analysis

Most website file servers can be configured to store information in a log file for every website page request they receive. Statistics concerning every request for a page from the website are recorded in the log file, thereby creating a record that can be analyzed to produce a website traffic report. The statistics typically include time of day, browser location, referring link, and the like. The creation of the log file will occur automatically, as html documents are requested by browsers. The log file can be analyzed periodically to process and summarize the collected statistics. The steps for retrieving html documents from a website are summarized below in Table 1.

Table 1

Summary of steps for retrieving html documents from a website with logging.

1. A web browser sends a request to a web file server for an html document.
2. The file server receives the request from the browser.
3. The file server returns the requested html document to the web browser.
4. The file server logs the transaction to a log file.

A common Internet device called a proxy server or web cache often complicates the process of creating a log file in response to html requests. A proxy server stores static web content (html data files) at a central location on the Internet to improve web performance by decreasing response times and also to decrease capacity requirements at individual web file servers by distributing the storage load. If a web browser is communicating via a proxy server, then the steps required to obtain an html document are as listed in the Table 2 summary below:

Table 2

Page request via proxy server.

1. A web browser sends a request for an html document to a website-hosting computer.
2. The html request is redirected to a proxy server.
3. The proxy server computer receives the request.
4. The proxy computer checks to see if it has the requested html document in its cache storage.
5. If the document is cached, the proxy server provides the html document back to the browser. If the page is not in the proxy's cache, it requests the page from the page-hosting web file server.
6. The web file server receives the request for the html document from the proxy server.
7. The web file server provides the html document.
8. The web file server computer records information about the transaction in a log file.
9. The proxy server caches the html document.

It should be noted that Step 5 may result in a proxy server or web cache serving the html document directly to the web browser. In this case the webserver never receives a request and thus never records the request in its log file. Some proxies may notify the web server of these requests, depending on proxy and web-server configurations.

The log-based tools that exist today examine logs to form a statistical analysis of a website. Log analysis tools are run locally on the computer or on a system to which the log files are transferred. The steps that are taken to analyze the logs are summarized below in Table 3.

Table 3

Log Analysis for Web Traffic.

1. Read the log file.
2. Analyze the log entries.
3. Form traffic analysis results.
4. Save the results to disk.

There are several drawbacks to using log analysis tools. For example, if the log analysis tools are installed locally on the website file server, then the web site owner can only use tools that are available for the platform of the hosting file server computer. These tools typically do not provide a real-time view of the website traffic data, rather, they simply analyze the traffic log data files when the tools are executed. In addition, website owners who operate very high-traffic sites often disable logging, because of inadequate computer resources to operate both the file server function and the traffic logging function. This severely reduces the effectiveness of log-based analysis. As noted above, website owners who do not host their sites may need to obtain permission to install traffic analysis software at their hosting provider. Finally, the system resources required to perform the log analysis function are such that log analysis can impede website performance, slowing down responses to web browsers who want to view the website.

If the website owner chooses to transfer the log files to another system for processing, then there are also drawbacks to that technique. For example, transferring the traffic logs is a cumbersome process in that a single day's log file for a busy web site often represents hundreds of megabytes of data. In addition, an additional system is required for receiving the transferred log files.

Internet-Based Analysis

Rather than using web traffic logs, website owners may choose to use the services of an Internet-based traffic analysis service. Such services typically are notified of each website visit through Internet communications features of the http specification and prepare statistical reports for client website owners.

The Internet-based analysis typically relies on special html code inserted into the home page of a website. Web html documents usually contain a mixture of text and graphical elements that are only retrieved by opening subsequent connections and retrieving files, such as images or frames. These graphical elements are displayed in the user's browser by retrieving the source location attribute (also referred to as the source Uniform Resource Locator, or URL) of the graphical element, opening a connection to the source location, and retrieving the data bytes that comprise the image file.

Internet-based analysis tools can count requests for a source file regardless of the actual location of the source file. Thus, a graphical element can be retrieved from a server that is in a different location from the primary website file server. The Internet-based analysis tools use embedded html code usually contains a graphical element, as described above, with a source location attribute directing a browser to the computers of the traffic analysis service. When the website home page is visited, all of the images on the home page will be requested by the browser, including the graphical element source. Headers that are automatically supplied with the browser request will reveal information about the website visitor.

The information about the website visitor is gathered and stored at the traffic analysis computers, and then the requested data, such as a graphical image, is returned to the website visitor's browser. Those skilled in the art will be familiar with so-called Internet "cookies", which can be used to timestamp the website visitor. The timestamp value can uniquely identify a website visitor. The html code sometimes contains scripts that gather more information (such as monitor resolution, etc.) about the website visitor. This additional information is typically included with the request headers. In this way, Internet-based traffic analysis tools can provide traffic statistics in real-time by recording each request for a website page when the request occurs. That is, each website visit generates a "hit" statistic that can be accumulated from all the visitors to produce a count of requests for the website home page. These hits are interpreted as a count of the number of visits to the website.

Unfortunately, Internet-based tools only collect statistics when a page that contains the html code is viewed, so that visits to all other pages are ignored. To alleviate this problem, some traffic analysis services allow the html code to be placed on multiple pages, therefore counting a website visitor when there is a request for any page on which the website owner has placed the html graphical element code. Thus, the Internet-based analysis tools can be an improvement over log-based tools, because the Internet tools do not require the transfer of large log files for processing, but unfortunately, typical Internet-based tools do not account for, and do not collect data on, multiple visits to a website by the same visitor. In addition, conventional Internet-based traffic analysis tools do not indicate the actual sequence, or path, followed by a website visitor from page to page of a website. The website path taken by visitors can be very important in identifying the most viewed pages of a website or least popular.

From the discussion above, it should be apparent that there is a need for efficient analysis of website traffic patterns with sufficient detail so that visits to each page of a web site can be accounted for and a visitor's path through the pages of a website can be tracked, all without unduly taxing the resources of the website and traffic analysis computers. The present invention fulfills this need.

SUMMARY

The present invention provides an Internet-based analysis tool that can follow, in real-time, the flow of traffic through a website. For every website page requested by a website visitor, the state of the visitor's browser is recorded. The state includes the clock time and an indication of every page at the website visited by the browser during the current visit. In this way, data relating to the path visitors take through a website can be accurately collected and studied. The state of the visitor's browser path is maintained in a traffic analysis cookie that is passed between a traffic analysis file server and the visitor browser with every website page requested from the website file server for viewing. The cookie is maintained in a size that can be passed from server to browser and back again without negatively impacting server performance and without negatively impacting browser performance. If desired, the functions of website file server and traffic analysis cookie management can be handled by respective website file server computers and traffic analysis computers. The data in the traffic analysis cookie can follow the visitor browser through independent web file servers, regardless of how the pages of a website might be distributed in storage. In this way, the present invention permits page-by-page analysis of website traffic patterns for each website visitor, without unduly taxing the resources of the website and traffic analysis computers.

In one aspect of the invention, the first page of a website that is viewed by a visitor defines the start of that visitor's path at the website. Page requests, transferred data, and cookie exchanges are made through the hypertext transfer protocol (http) specification. Thus, each page request contains an http referrer header with the URL with which the respective connection is associated. Through the use of referring data, a computer system constructed in accordance with the invention can monitor the page-by-page flow as a visitor "travels" through the website. Every page requested and viewed by that visitor is recorded and maintained in the traffic analysis cookie, which is passed back and forth between the visitor browser and the traffic analysis server to maintain a record of the visitor website path. New data pertaining to the site's dynamics is thereby collected and analyzed with every passing of the cookie. This process continues until the visitor leaves the web site, or until the cookie has expired.

The collection of website path data in the cookie permits the data to be analyzed and available for viewing in real-time. This allows the website owner to monitor website traffic patterns in real time. It also permits the website owner to monitor changes to a website in real time, reducing the time it takes to understand the impact of the changes. In another aspect of the invention, website owners can follow a browser path over multiple file servers, so long as the web pages contain the html code necessary to maintain the cookie with its path data. That is, the invention permits monitoring of website traffic even for websites that are hosted across several independent file servers.

Other features and advantages of the present invention should be apparent from the following description of the preferred embodiment, which illustrates, by way of example, the principles of the invention.

BRIEF DESCRIPTION OF THE DRAWINGS

FIG. 5 is a representation of the html source code that can produce the website page illustrated in FIG. 4.

FIG. 8 is an exemplary cookie format that is passed back and forth between browser and server to track website traffic, in accordance with the invention.

FIG. 9 is an example of a traffic analysis cookie passed between the browser and traffic analysis server of FIG. 1.

FIG. 10 is a representation of html source code that is used on the most heavily visited page of a website, such as an index page or home page.

FIG. 11 representation of html source code that is used on all remaining pages of a website other than the most heavily visited page.

DETAILED DESCRIPTION

Figure 1:
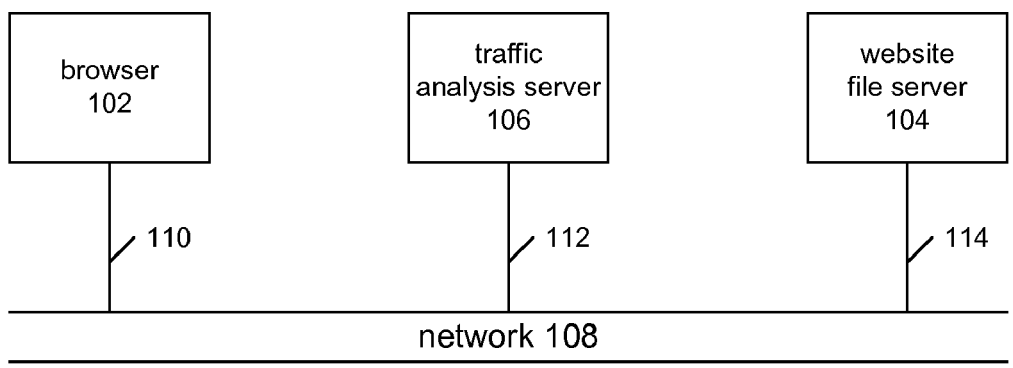
FIG. 1 is a block diagram of a computer network, such as the Internet, over which requests for data files are processed in accordance with the present invention.

FIG. 1 is a representation of a system 100 that provides Internet website traffic analysis in accordance with the present invention. An Internet user at a computer 102 having a graphical user interface (GUI) browser program gains access to Internet content to be delivered from website file servers 104 by requesting hypertext mark-up language (html) documents at the website server computers, thereby "visiting" the hosted websites. Data relating to such website visits is automatically collected at traffic analysis servers 106. User requests for website pages and exchange of traffic analysis data takes place over network connections that can include conventional telephone lines and high-speed digital access lines, collectively referred to as the Internet 108. Thus, the user 102 is connected to the Internet via a network connection line 110 that may be a conventional analog telephone line or maybe a high-speed access line. Similarly, the traffic analysis server 106 is connected to the Internet via a connection 112 and the website server 104 is connected via a connection 114.

Those skilled in the art will appreciate that the Internet content servers 104 comprise multiple file servers at which website files are stored. Those skilled in the art also will appreciate that the user computer 102, traffic analysis server 106 computers, and website servers 104 can all have a similar computer construction. Moreover, the functions of the website servers 104 and traffic analysis servers 106 can be performed by the same computers, if desired. In the preferred embodiment, traffic analysis and web hosting functions are performed by different computers and independent commercial entities.

In accordance with the invention, the owner of a website installs html code that utilizes processing automatically performed by Internet browsers and file servers that conform to the hypertext transfer protocol (http) specification, thereby keeping accurate website visit statistics on each visitor to a website.

Figure 2:
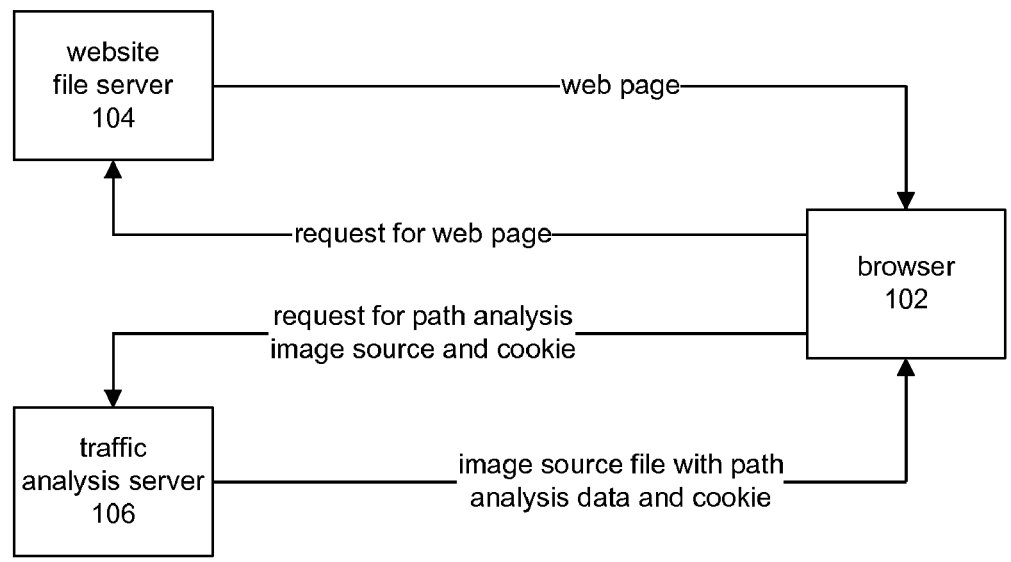
FIG. 2 is a graphical representation of the data flow over the network among the computers illustrated in FIG. 1.

FIG. 2 is a graphical representation of the data flow over the Internet between the user browser, website, and traffic analysis computers 102, 104, 106, respectively, illustrated in FIG. 1. The server computers, comprising the website server 104 and traffic analysis server 106 computers, are shown on the left side of FIG. 2. The user browser computer 102 is shown on the right side of FIG. 2. Those skilled in the art will understand that a cookie is a data structure that is written to a browser computer upon an initial visit to an Internet website in response to server-side processing. Thereafter, when the browser again requests a page from the website, the browser will automatically provide the stored cookie along with its request for a page. As noted above, a web page typically includes a mixture of text and audio, video, and image files. Those skilled in the art will understand that a graphical element such as an image on a web page must be specified by the location of an image source file, which the browser will request when it attempts to display the web page.

In accordance with the invention, a request for a website page that has been marked or tagged with the appropriate html code includes a graphical element that specifies an image source file located at the traffic analysis server. A cookie that contains path analysis data is initially produced by the traffic analysis server and is returned to the browser computer with the image source file. The browser stores the cookie at the browser computer in accordance with conventional browser operation. The remaining website page elements, such as text and other images, are preferably provided by the website file server. As noted above, in an alternative construction, all of the website files and traffic data can be provided by a single server.

Thus, FIG. 2 shows a request for an image source file being made to the traffic analysis server 106 at substantially the same time that the request for the website page is being made to the website server 104. FIG. 2 also shows that the image source file and the cookie are being returned by the traffic analysis server computer, while the remaining website page information is being provided by the website server computer.

Figure 3:
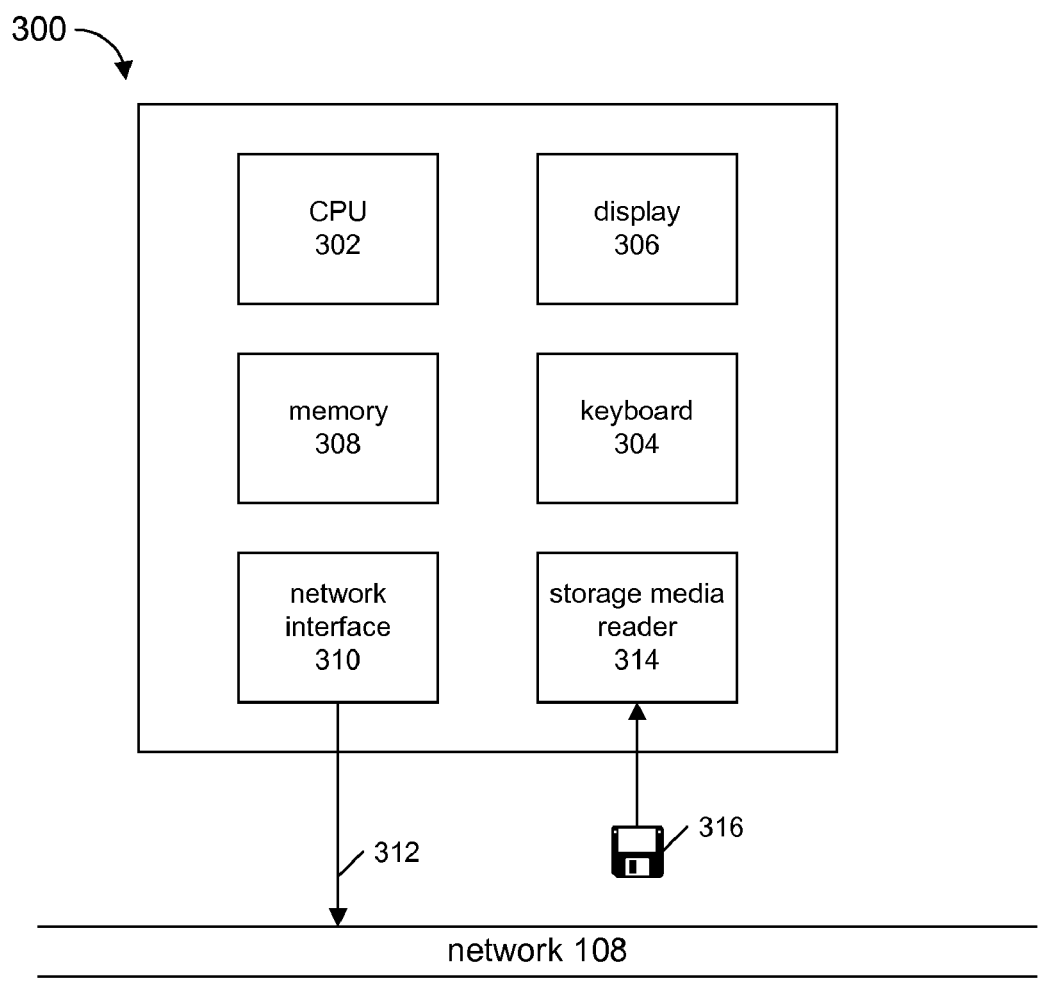
FIG. 3 is block diagram that shows the construction of one of the computers illustrated in FIG. 1.

FIG. 3 is a block diagram of an exemplary computer 300 such as might comprise any of the computers 102, 104, 106. Each computer 300 operates under control of a central processor unit (CPU) 302, such as a "Pentium" microprocessor and associated integrated circuit chips, available from Intel Corporation. A user can input commands and data from a keyboard 304 and can view inputs and computer output at a display 306. The display is typically a video monitor or flat panel display. The CPU operates under control of programming steps that are stored, temporarily, in memory 308 of the computer. Each computer communicates with the Internet 108 through a network interface 310 that enables communication over a connection 312 between the network 108 and the computer 300. The computer also can receive computer instructions, or data, from a storage media reader 314. The storage media reader 314 receives storage media 316 from which it can read stored information. That is, the storage media can contain program steps that are executed by the CPU to perform a method for providing Internet access as described above. The storage media thereby comprises a program product that embodies the program steps executed by the CPU. Examples of storage media include floppy disks and CD-ROM media.

Figure 4:
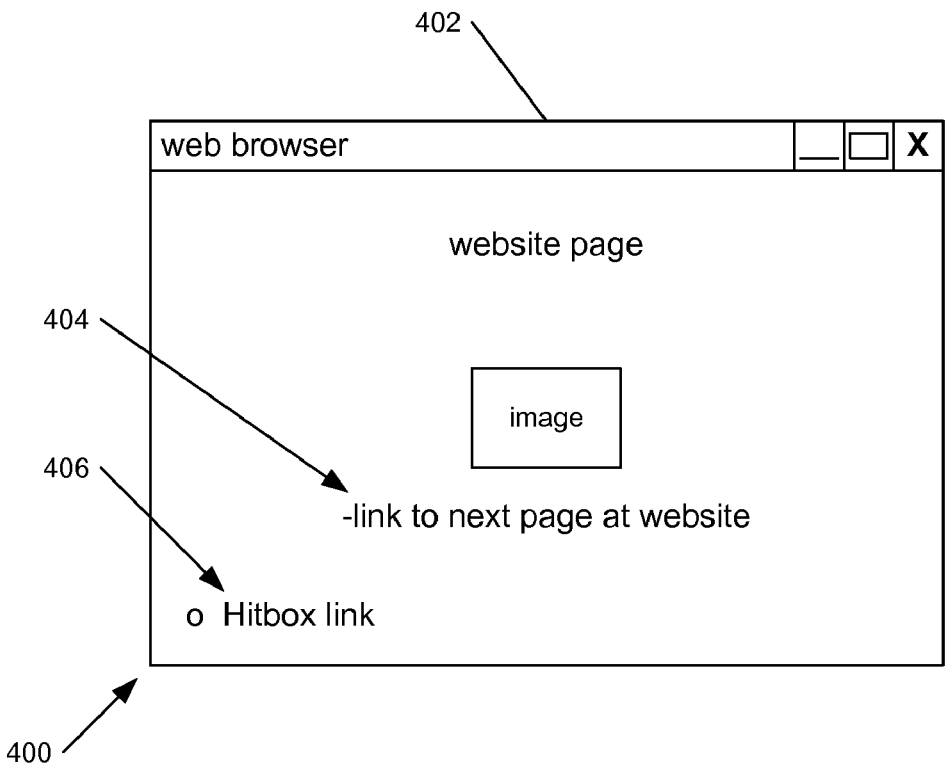
FIG. 4 is a representation of a website page as it would appear in a browser window on the display screen of the browser computer illustrated in FIG. 1.

FIG. 4 shows a website page as it would appear in a browser window on the display screen of the browser computer illustrated in FIG. 1. An exemplary portion of html source code for the FIG. 4 website page is shown in FIG. 5.

FIG. 4 shows a display window 400 having a title bar across the top and sizing icons in the upper right corner, as is standard in conventional windowing environments. The website page 402 contains a title, "Website Page", at the top center and includes a link to a next website page, indicated by "Link to next page at website". At the bottom of the web page is a graphical element 406 comprising a link to a traffic analysis website, identified as "Hitbox link". Those skilled in the art will appreciate that the corresponding html code of FIG. 5 will, when processed to a browser, produce a display approximately the same as shown in FIG. 4. The various html code elements contained within the "<" and ">" characters are commonly referred to as tags.

Thus, one tag in the html source code of FIG. 5 is for the title, called Website Page in the example. Another tag, called an "href" tag, defines a link that will direct the browser to request a source file at another location. For example, an href tag in FIG. 5 requests the next page of the website, at the subnet file name of "nextpage.html". Finally, the image code for the graphical element that provides processing in accordance with the invention is placed in the html code for the website page, shown in FIG. 5 simply as the traffic_analysis_code website. The image code will be described in greater detail below.

Figure 6:
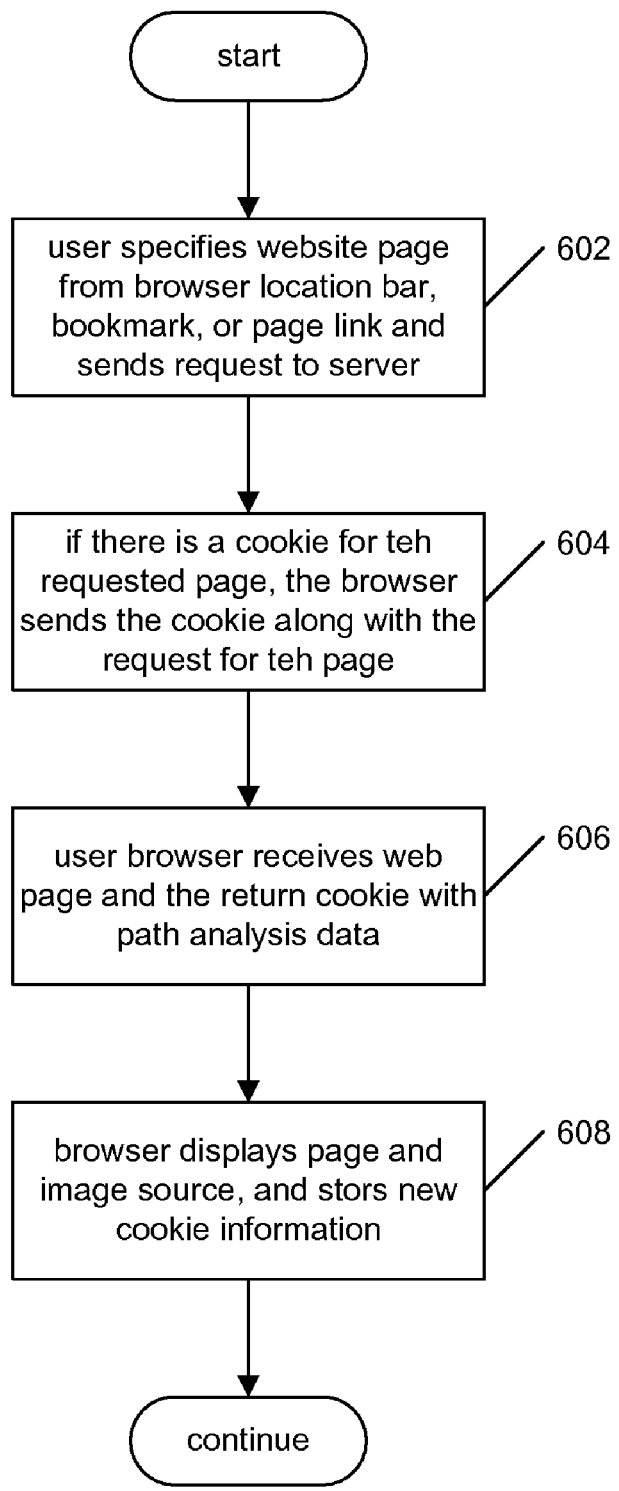
FIG. 6 is a flow diagram that illustrates the processing steps executed by a browser of the computer system of FIG. 1 to perform operations in accordance with the present invention.

The processing of the html code will be better understood with reference to the flow diagram of FIG. 6, which illustrates the processing steps executed by a browser 102 of the computer system of FIG. 1 to perform operations in accordance with the present invention.

In the first processing step, represented by the FIG. 6 flow diagram box numbered 602, a browser user requests a website page from a browser location bar, page link from another website page, or bookmark. When a browser is first launched, the browser identifies the websites for which it has cookies. Thereafter, if the user directs the browser to one of the identified websites, the browser automatically provides the cookie with its request for a page from the website. Those skilled in the art will appreciate that a website is identified by having a common URL domain, at which other html document pages are stored in a hierarchical file structure.

The FIG. 6 flow diagram box numbered 604 illustrates the next browser processing step, where the browser determines if there is a cookie for the website of the requested page and, if so, sends the corresponding cookie along with the request for the page. After some processing by the website file server (not illustrated in FIG. 6), the browser receives the requested html website page and also the returned cookie, as indicated by the flow diagram box numbered 606. In the case of processing the traffic analysis cookie of the invention, the cookie contains traffic analysis path data. Finally, as represented by the flow diagram box numbered 608, the browser displays the appropriate html code and the image source, and stores the traffic analysis cookie, just as it would any other website cookie it received. Browser operation then continues. Thus, implementation of web traffic analysis by cookie updating and exchanging in accordance with the invention is completely transparent to the browsers of website visitors.

Figure 7:
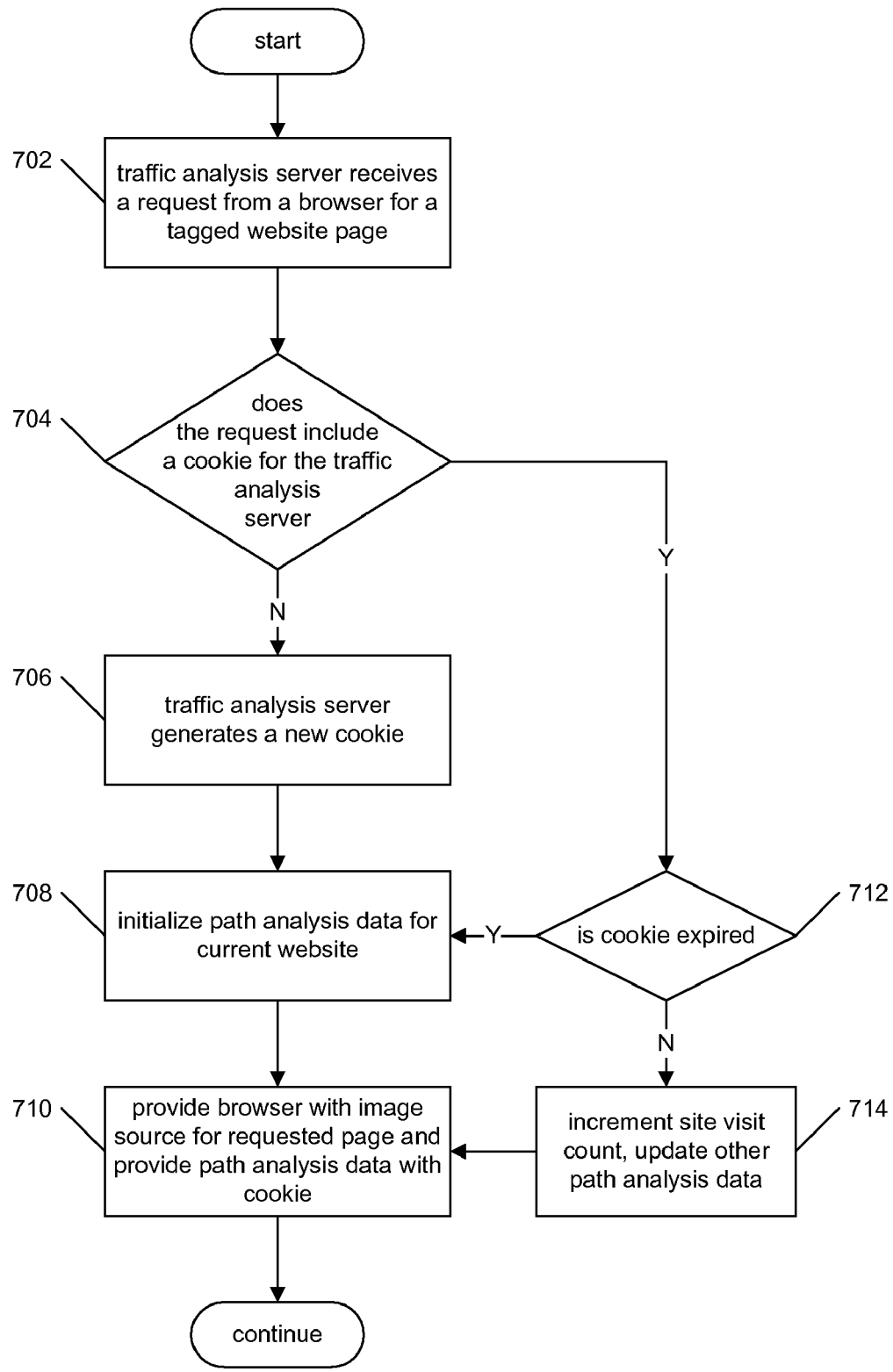
FIG. 7 is flow diagram that illustrates the processing steps executed by a server computer of the system illustrated in FIG. 1.

FIG. 7 is flow diagram that illustrates the processing steps executed by a server computer of the system illustrated in FIG. 1, operating in complementary fashion to the user browser described above. In the first processing step, represented by the flow diagram box numbered 702, the traffic analysis server receives a request from a user browser for the image source for a website page that is tagged with the traffic analysis code. The traffic analysis server then determines if the request includes a cookie, as indicated by the decision box numbered 704.

If the request has no cookie, a negative outcome at the box 704, then the traffic analysis server generates an initial cookie. This action is represented by the flow diagram box numbered 706. Next, the path analysis data is initialized. For example, cumulative data such as elapsed visit time is set to zero, and there will be no website path tracking data in the cookie. The initialization of data is represented by the flow diagram box numbered 708. The traffic analysis server then provides the browser with the image source from the requested website page, and also provides the path analysis data, as indicated by the flow diagram box numbered 710. Server operation then continues.

If the page request from the browser did contain a cookie, an affirmative outcome at the decision box numbered 704, then the traffic analysis server next checks to see if the cookie has expired. The checking step is represented by the decision box numbered 712. In the preferred embodiment, the time between visits to the website is tracked by checking the timestamp data that is placed in request header information, as described further below. If a cookie has a timestamp value that indicates a sufficiently large amount of time has elapsed since the previous visit to the website, then that cookie is deemed expired. This keeps the traffic path data analysis more valid, so that separate visits are not calculated as one. A typical expiration time for a cookie will be approximately fifteen minutes. Thus, a visit to the same website that occurs more than fifteen minutes after the last page request to that same website will be treated as a new visit and a new sequence of page requests to be tracked.

Thus, if the page request did contain a cookie, and if that cookie was expired, then the traffic analysis data for the website will be initialized. This corresponds to an affirmative outcome from the decision box numbered 712, which then takes processing back to the initialization step represented by box 708. The remaining outcome if for a page request that did contain a cookie, and for which the cookie was not expired, represented by a negative outcome at the decision box 712. The processing for an unexpired cookie is indicated by the flow diagram box numbered 714, which indicates that traffic path analysis data is updated. This processing includes incrementing a site visit count, and other processing described in greater detail below. Processing then continues with providing the image source and updated cookie to the browser at box 710.

FIG. 8 is an exemplary cookie format such as will be passed back and forth between browser and server to track website traffic, in accordance with the invention. The cookie format begins after the identifier "cookie", with a cookie name that in the preferred embodiment is set to be the same as the account ID number. Next is an image ID reference to pages indexed at a table in the traffic analysis server site. This permits a very small character string to serve as a unique identifier for each of the pages of a website, thereby keeping the size of the cookie to a minimum. The next cookie field is a site visit count that is incremented if the cookie has an old path name when it is received by the traffic analysis server from the browser.

Next, the average time between website visits is calculated by the server and kept in the cookie, followed by the time spent so far at the website. The time spent so far is determined by the difference between the clock time when the cookie was first issued and the current clock time. The next field is for the current clock time, which is retrieved from the browser. This is described in greater detail below in conjunction with FIGS. 10 and 11. The last field of the cookie is the sequence of website page references. These references comprise a sequence of page index numbers separated by the "|" pipe delimiter.

FIG. 9 is an example of path analysis data stored in a cookie. The HB59999999999 field represents a cookie name and account number for the customer of the website traffic analysis service. The next field is the image ID, which can be correlated with data at the website traffic analysis server to identify the web page currently being viewed by the browser. The next field is a site visit count, which is incremented with each new page of the site that is requested by the browser during a current visit. In the preferred embodiment, a current visit is defined as a visit during which no more than fifteen minutes elapses between requests for a page at the particular website. Other time limits may be selected, as desired. The next field is for the calculated average time between site visits, a statistic that is maintained by the traffic analysis server computer. The time spent is calculated in accordance with the cookie expiration time limit for the definition of a current visit. That is, as long as no more than the limit time of fifteen minutes elapses between page requests for the website, the visit time will accumulate for as long as the browser is at the website. The current clock time is obtained from the browser. Finally, the path data shows the sequence of page requests for the current visit. The FIG. 9 example shows that this particular browser began the visit at the website page designated Page 0, which is typically the home page of the website, and then went to Page 1 of the website, before returning to the home page and then going back once again to Page 1. Thus, this cookie is updated and passed back and forth between the browser and the traffic analysis server as the website visitor moves along the website.

In accordance with the invention, every page of a website can include traffic analysis code with html tags that will cause the transfer of data to the traffic analysis server when each page is viewed. To reduce the amount of html code that must be embedded in the pages of a website, the traffic analysis code is implemented in two versions, a complete version that extracts various browser parameters and a shorter, abbreviated version that extracts only browser information that is necessary for performing accurate website traffic analysis. The exemplary html code that accomplishes these features is shown in FIG. 10 and FIG. 11.

FIG. 10 is a representation of the complete version of html source code that is used on the most heavily visited page of a website, such as an index page or home page.

The first item of code in FIG. 10 is an html tag that sets the Javascript feature of the browser, so that the code up through a corresponding "/script" tag is executed only if Javascript is supported by the browser. It should be noted that html code is not line sensitive, so that lines of code are shown in FIG. 10 only for convenience of illustration. Those skilled in the art will understand that lines of html code are normally delimited only by the ";" character.

In the first item of Javascript code in FIG. 10, the variable "dt" is set to the current time and date, which the following Javascript code will cause to be retrieved from the browser. This provides a timestamp function that will return the value to the traffic analysis server. Next, the variable "rf" is set equal to the URL of the page from which the browser was referred (the prior browser page). The next code is a test to prevent an error condition from occurring if there is no previous page. In particular, if "rf" is undefined, then the user came to current page by bookmark or by typing in URL at the browser location bar. If that is the case, then the variable "rf" is set equal to the text "bookmark". In the next piece of code, the variable "bn" is set to the browser application name. The next code is for data compaction, to replace a longer string with a shorter string. Specifically, if the browser name is Microsoft, the variable "bn" is set to "MSIE". The variable "bv" is the browser version number in integer format.

The next part of the code checks for a Netscape browser and retrieves browser parameters, depending on the version number of the Netscape browser. Thus, if the Netscape browser version is 4.0 or higher, then the variable "ln" is set to the browser language selected by the browser user, such as English, French, German, and so forth. This feature is only supported by Netscape 4.0 and higher, so the code checks the version number first to avoid an error message. Next, if the Netscape browser version is 3.0 or higher, then the variable "pl" is set to retrieve the various plug-ins that are installed in the browser. This feature is only supported by Netscape 3.0 and higher, so the code checks the browser version number first to avoid an error message. The Javascript listing is then terminated by the "/script" corresponding to the initial "script language" setting.

The next portion of code again invokes the Javascript feature of the browser, this time providing code that will be executed only if the browser has Javascript 1.1 support. First, the code sets the variable "sv" to 11 to indicate the Javascript supported version is 1.1, and then the code checks to see if the browser has Java enabled for applets. If it is true that applets are supported, then the code sets the variable "ja" to y (yes), otherwise it is set to n (no). The "/script" tag ends the Javascript 1.1 code.

The next portion of code is executed only if Javascript 1.2 is supported by the browser. The first portion of code sets the variable "sv" to 12 to indicate the Javascript supported version is 1.2, and then sets the variable "ss" to the screen width and screen height of the computer at which the browser is running. This information is obtained from the browser "screen" object. Next, the code causes a check of the browser name. If the browser name has been set to MSIE, then the variable "sc" is set to the color depth and pixel depth attributes of the computer at which the browser is running (obtained from the "browser" object). Retrieval of this information currently is only supported by the MSIE browser. Next, if the variable "sc" is undefined, then "sc" is set to "na" to reduce number of data characters that will have to be transmitted in the header information. Finally, the "/script" is the ending tag for the Javascript 1.2 code.

The next code is executed only if Javascript 1.3 is supported by the user browser. First, the variable "sv" is set to 13 to indicate that Javascript 1.3 is supported. The 1.3 code is then terminated, because there presently are no new features in Javascript 1.3 to utilize. The Javascript version number that is supported is retrieved for data gathering purposes.

Beginning with the next script language setting in FIG. 10, Javascript is once again invoked, so that all browsers supporting Javascript will execute the following code. In the code, the variable "arg" is set equal to a string of concatenated variables comprising the previously set values for the browser name, browser version, screen size, screen color and depth, current date, and Javascript supported version. Next, the variable "arg" is concatenated with more data, including the Java applet enablement variable, the referring page, browser language, and "escape" parameter.

Next, a series of variables x1, x2, x3, and x4 are defined. First, the variable x1 is set equal to a string that defines an "href" link to the traffic analysis server, which is shown in FIG. 10 as being a URL of "hitbox.com" for illustrative purposes. The variable x2 is set equal to a character string to indicate the image source of the graphical element that accompanies the preceding href link. The string includes exemplary user account information and website page information. The variable x3 is set equal to a character string that defines the image area for display of the href image source. In the preferred embodiment, this corresponds to a small display area so that placing the browser display cursor over the display area and clicking the display mouse will result in the browser being directed to the traffic analysis web site. The variable x4 is next set to define an "alt" tag, and then the "/a" tag closes out the "href link" text. The next line of code sets the Javascript "document" object to concatenate the strings x1, x2, arg, x3, and x4 to dynamically generate the URL to which the browser will be directed for delivering the header information and obtaining the href image source. The "/script" tag ends the Javascript code.

The next portion of code is executed only if Javascript 1.2 is supported by the browser. The "document" object is used to generate a "<" character followed by a "!--" character to indicate a Javascript comment symbol. The "/script" tag ends the Javascript 1.2 code.

In FIG. 10, the following "noscript" tag indicates code that will be executed only by browsers that do not support any form of Javascript, so that the following script will be ignored by all Javascript-enabled browsers. The "noscript" code first defines an href tag to indicate a link image to the traffic analysis server ("hitbox.com") website. Next, the border, height, and width parameters of the href image display are set. The "/a" tag ends the "noscript" code.

The last portion of code in FIG. 10 invokes Javascript 1.2, and simply writes a comment "-→" character.

FIG. 11 is a representation of the abbreviated html source code that is used on all pages of a website other than the most heavily visited page of the web site. The abbreviated code does not extract browser parameters, such as accomplished by the complete code illustrated in FIG. 10. The only purpose of the FIG. 11 code is to assist in tracking the flow of a website visitor from page to page of the website.

The first item of code in FIG. 11 is an "href" link tag to the traffic analysis server website, shown as the "WebSideStory" website. Thus, if the browser user places the display cursor over the image link and clicks on the linked display area, the browser will be directed to the traffic analysis website. Next, FIG. 11 shows an image source definition tag. As described above, this is the format of the request that will be sent by the browser when the page containing the FIG. 11 code is loaded and displayed. Because the purpose of the FIG. 11 code is to track browser movement through the monitored website, the request simply contains the account ID information, a test code for error checking, a link name, and a page name. The link name and page name are designated by the website owner, who assigns names or other designations for the links and pages at the monitored website. This will give the traffic analysis server the account number (hb), a test code (cd), a subpage number (I), and the name of the current page (n). The last line of code sets image display parameters.

Thus, as described above, the invention permits a website owner to track website traffic and collect statistics with no difference in operation to a website visitor, simply by embedding html tags in the web pages. In this way, every page of a website can be monitored in real time.

The present invention has been described above in terms of a presently preferred embodiment so that an understanding of the present invention can be conveyed. There are, however, many configurations for html document retrieval and network traffic systems not specifically described herein but with which the present invention is applicable. The present invention should therefore not be seen as limited to the particular embodiments described herein, but rather, it should be understood that the present invention has wide applicability with respect to html document retrieval and network traffic analysis generally. All modifications, variations, or equivalent arrangements and implementations that are within the scope of the attached claims should therefore be considered within the scope of the invention.

The invention claimed is:

1. A computer implemented method for tracking user traffic at a website that comprises a plurality of web pages, wherein each web page comprises one or more files stored at one or more website file servers, comprising:
   identifying a first web page in the website as a home page;
   embedding a first traffic analysis code in the identified home page, wherein the first traffic analysis code is configured to extract browser parameters from a web browser that has requested the identified home page;
   identifying a plurality of second web pages in the website as tracking enabled pages, wherein the tracking enabled pages do not include the identified home page; and
   embedding a second traffic analysis code into each of the plurality of tracking enabled pages of said website, wherein the second traffic analysis code is configured to extract information necessary for performing website traffic analysis.

2. The method of claim 1, wherein the identified home page is one of the most heavily visited pages of the website.

3. The method of claim 1, wherein the identified home page is an index page.

4. The method of claim 1, wherein the first traffic analysis code is further configured to extract information necessary for performing website traffic analysis.

5. The method of claim 1, wherein the first traffic analysis code is further configured to determine one or more plug-ins associated with the browser.

6. The method of claim 1, wherein the first traffic analysis code is further configured to determine the Javascript version number that is supported by the browser.

7. The method of claim 1, wherein the first traffic analysis code is further configured to determine whether the browser supports Java applets.

8. The method of claim 1, wherein the first traffic analysis code is further configured to determine the screen width and screen height of the computer at which the browser is running.

9. The method of claim 1, wherein the first traffic analysis code is further configured to determine the name of the browser.

10. The method of claim 1, wherein the first traffic analysis code is further configured to determine the version of the browser.

11. The method of claim 1, wherein the second traffic analysis code does not extract browser parameters from a web browser.

12. The method of claim 1, wherein the first and second traffic analysis codes cause a requesting browser to transfer data to a traffic analysis server when a web page including the respective first or second traffic analysis code is viewed by the requesting browser.

13. The method of claim 1, wherein the second traffic analysis code is further configured to enable tracking the flow of a website visitor from page to page of the website.

14. A computer readable storage medium, comprising:
   a website that comprises a plurality of web pages, wherein each web page comprises one or more files stored at one or more website file servers;
   a first traffic analysis code embedded in a first web page of said website, said first web page identified as a home page, wherein the first traffic analysis code is configured to extract browser parameters from a web browser that has requested the home page;
   a second traffic analysis code embedded into a plurality of second web pages of said website, each of said plurality of second web pages identified as a tracking enabled page, wherein the second traffic analysis code is configured to extract from a web browser that has requested the tracking enabled page information necessary for performing website traffic analysis.

15. A computer readable storage medium having stored thereon one or more sequences of instructions for causing one or more microprocessors to perform the steps for tracking user traffic at a website that comprises a plurality of web pages, wherein each web page comprises one or more files stored at one or more website file servers, the steps comprising:
   identifying a first web page in the website as a home page;
   embedding a first traffic analysis code in the identified home page, wherein the first traffic analysis code is configured to extract browser parameters from a web browser that has requested the identified home page;
   identifying a plurality of second web pages in the website as tracking enabled pages, wherein the tracking enabled pages do not include the identified home page; and
   embedding a second traffic analysis code into each of the plurality of tracking enabled pages of said website, wherein the second traffic analysis code is configured to extract information necessary for performing website traffic analysis.

16. The computer readable medium of claim 15, wherein the first traffic analysis code is further configured to extract information necessary for performing website traffic analysis.

17. The computer readable medium of claim 15, wherein the first and second traffic analysis codes cause a requesting browser to transfer data to a traffic analysis server when a web page including the respective first or second traffic analysis code is viewed by the requesting browser.

18. The computer readable medium of claim 15, wherein the second traffic analysis code does not extract browser parameters from a web browser.

19. The computer readable medium of claim 15, wherein the second traffic analysis code is further configured to enable tracking the flow of a website visitor from page to page of the website.

* * * * *